United States Patent
Monne et al.

(10) Patent No.: US 8,301,442 B2
(45) Date of Patent: Oct. 30, 2012

(54) METHOD FOR SYNCHRONIZATION BETWEEN A VOICE RECOGNITION PROCESSING OPERATION AND AN ACTION TRIGGERING SAID PROCESSING

(75) Inventors: Jean Monne, Perros Guirec (FR); Alexandre Ferrieux, Pleumeur Bodou (FR)

(73) Assignee: France Telecom, Paris (FR)

(*) Notice: Subject to any disclaimer, the term of this patent is extended or adjusted under 35 U.S.C. 154(b) by 914 days.

(21) Appl. No.: 11/918,180

(22) PCT Filed: Apr. 6, 2006

(86) PCT No.: PCT/FR2006/050311
§ 371 (c)(1),
(2), (4) Date: Dec. 30, 2008

(87) PCT Pub. No.: WO2006/106272
PCT Pub. Date: Oct. 12, 2006

(65) Prior Publication Data
US 2009/0228269 A1    Sep. 10, 2009

(30) Foreign Application Priority Data
Apr. 7, 2005 (FR) .................................. 05 50896

(51) Int. Cl.
*G10L 15/00* (2006.01)

(52) U.S. Cl. ............................................ 704/231
(58) Field of Classification Search .................. 704/231
See application file for complete search history.

(56) References Cited

U.S. PATENT DOCUMENTS

| | | | | |
|---|---|---|---|---|
| 6,157,909 A * | 12/2000 | Mauuary et al. | ............... | 704/228 |
| 6,230,138 B1 * | 5/2001 | Everhart | ........................ | 704/275 |
| 6,658,578 B1 * | 12/2003 | Laurenti et al. | ............... | 713/324 |
| 7,349,844 B2 * | 3/2008 | Staiger | .......................... | 704/231 |
| 7,689,424 B2 * | 3/2010 | Monne et al. | ............... | 704/270.1 |
| 2003/0004712 A1 | 1/2003 | Erell | | |

FOREIGN PATENT DOCUMENTS

| | | |
|---|---|---|
| JP | 04 024694 | 1/1992 |
| JP | 2002 108390 | 4/2002 |
| JP | 2003 241794 | 8/2003 |

* cited by examiner

*Primary Examiner* — Susan McFadden
(74) *Attorney, Agent, or Firm* — Cozen O'Connor

(57) ABSTRACT

A method of synchronizing an operation for processing, by an automatic speech recognition system of a device, a voice sequence uttered by a speaker and an action of the speaker intended to trigger the processing by the device. The processing operation is effected by the device from a given time preceding the action of the speaker. A time interval between the given time and the action of the speaker corresponds to a given interval.

7 Claims, 2 Drawing Sheets

METHOD FOR SYNCHRONIZATION BETWEEN A VOICE RECOGNITION PROCESSING OPERATION AND AN ACTION TRIGGERING SAID PROCESSING

RELATED APPLICATIONS

This is a U.S. national stage of application No. PCT/FR2006/050311, filed on Apr. 6, 2006.

This application claims the priority of French patent application no. 05/50896 filed Apr. 7, 2005, the content of both of which is hereby incorporated by reference.

The present invention relates to a method of synchronizing an operation of processing, by automatic recognition, speech from a voice sequence uttered by a speaker and an action by said speaker intended to trigger said processing.

BACKGROUND OF THE INVENTION

The invention finds a particularly advantageous application in the field of automatic speech recognition, in particular in multimedia terminals such as new generation mobile terminals, personal digital assistants (PDA), and remote controls incorporating a microphone.

In theory, when communicating with a voice server equipped with an automatic speech recognition system, a user of a mobile terminal, for example, does not have to effect any particular action to tell the recognition system that he is about to utter a voice sequence. In fact, the system is either always listening to the user or in a position to determine when the user is going to speak from the structure of the dialogue between the server and the user.

If it is always listening to the user, the recognition system searches the continuous sound stream that it receives for time periods that might correspond to voice sequences uttered by the user. This search is effected by means of a voice activity detector. This is known in the art. Of course, for this system to work correctly, voice activity detection must not generate too many false alarms or, failing this, the automatic speech recognition mechanism must reject false alarms.

This is why voice activity detection gives the best results in a close miking context, with the microphone close to the mouth of the speaker, favoring reception of the voice of the user over background noise that interferes with speech recognition.

Now, at present, with the growth of multimedia terminals, in order to enable the user to listen to voice messages while simultaneously reading information displayed on the screen of the terminal, "hands-free" miking is becoming more and more generalized. This makes automatic speech recognition more difficult, the level of the wanted voice signal decreasing while the background noise remains constant.

Moreover, as the user now has available media other than voice, it is becoming difficult for a recognition system to determine when the speaker is going to utter a voice sequence from the structure of the dialogue alone.

It is to remedy these drawbacks that some terminals are equipped with means enabling the user to trigger voice recognition processing, for example by pressing a key of a device known as a "push-to-talk" device. When the speaker starts to utter a voice sequence, he presses the key of this device to indicate to the server that the subsequent sound signal is a voice sequence that the speech recognition system must process. The speaker releases the key at the end of uttering said voice sequence. Thus the system attempts to recognize the user only when the user is pressing the key of the "push-to-talk" device, which prevents false alarms during periods in which the key is not pressed.

However, the "push-to-talk" device has the drawback that if the user begins to utter a voice sequence before pressing the key of the device, or continues said sequence after releasing the key, then the recognition system will not use the real sequence but will rather use a sequence that has been truncated in time.

Thus the technical problem to be solved by the present invention is to propose a method of synchronizing an operation of processing, by automatic recognition, speech in a voice sequence uttered by a speaker and an action by said speaker intended to trigger said processing, in such a manner as to reduce recognition errors that could arise because of imperfect synchronization between the triggering action inserted by the speaker and the start and the end of the voice uttered sequence.

SUMMARY OF THE INVENTION

The solution of the present invention to the stated technical problem is that said processing operation is effected from a given time $t_0$ preceding said action of the speaker.

Thus, if the user is late in triggering recognition processing relative to the start of the voice sequence, the recognition system can take into account information preceding that action but relating to the same sequence, in order to reduce errors that would be caused by the synchronization error.

In a first implementation, said processing operation consists in transferring, starting from said given time to, speech segments extracted from said voice sequence to an automatic speech recognition system.

In this implementation, the processing of said voice sequence by the speech recognition system is actually triggered when the user presses the "push-to-talk" key for example, but with a retroactive effect, the segments of the sequence in the time interval between said given time and the action of the user being transmitted immediately to the recognition system.

Since these past segments of the sequence are transmitted to the system without delay and the recognition processing is generally. faster than real time, the recognition result can be supplied with no real delay, despite the time necessary for the system to process the voice sequence portion preceding the action of the user.

The duration of the time interval preceding the action of the user for taking account of the additional voice sequence portion to be processed must be made sufficiently short not to introduce an excessively long delay, and sufficiently long to enable real compensation of the synchronization error. For example, this duration can be of the order of a few hundred milliseconds.

In practice, the invention provides for said transfer to be effected via a delay line. In particular, said delay line is implemented by means of a circular register.

In a second implementation, on detecting the start of voice activity between said given time $t_0$ and a given time $t_1$, said processing operation consists in validating the automatic recognition of speech that has been effected on said voice sequence.

In this implementation, speech recognition processing is effected continuously on all sequences received by the system, independently of any action by the user on a "push-to-talk" device, for example. Each time speech is detected during a sequence, a start of voice activity event is generated. These events are then validated or rejected as a function of their temporal compatibility with the actions of the user. More precisely, they are validated if they occur in a time interval bracketing the action of the user and rejected if they occur outside that time interval, which is determined by an acceptance time before the action of the user and an acceptance time after the action of the user.

It should be noted that the first implementation with retroactive processing does not increase the computation load on the recognition system, but can introduce a delay into the reaction of the system if the system is not fast enough to catch up after the user acts on the "push-to-talk" device. In contrast, the continuous implementation does not introduce any delay but does increase the computation load because of the processing performed on detections that are not compatible with actions on the "push-to-talk" device.

The above implementations relate to the problem of synchronizing an action by the user with the start of the voice sequence.

Turning now to synchronizing an action by the user with the end of the voice sequence, the invention provides for the processing of said voice sequence by automatic speech recognition to be extended beyond a second action of the speaker indicating the end of a voice sequence.

The recognition procedure can be extended by a period corresponding to the tolerance allowed between the end of the voice sequence and releasing the key of the "push-to-talk" device, for example.

It should be noted that indicating the end of a sequence by a deterministic action by the user is optional, since the recognition system can be adapted to detect the end of said sequence for itself. Under such circumstances, it is possible to envisage the action indicating the start of a sequence being in the form of a single pulse that is transmitted to the automatic speed recognition system. If necessary, a new pulse can indicate the end of a sequence to the system.

BRIEF DESCRIPTION OF THE DRAWINGS

FIG. 2 represents a terminal equipped with a microphone 11 intended primarily for recording voice sequences uttered by a speaker, in particular during exchanges with a voice server 20 via an automatic speech recognition system. Note that said recognition system can be installed in the server or in the terminal itself. The invention is independent of the actual implantation of the system, however.

As shown in FIG. 2, the terminal also includes a "push-to-talk" device 12. The user pressing a button of this device sends the recognition system a start of voice sequence indication and, where applicable, an end of sequence indication.

An object of the invention is to remedy the negative impact on recognition processing that could result from poor synchronization between the actions by the user and the start or the end of the voice sequence uttered.

FIG. 1(a) shows a raw recording of sound picked up by the microphone 11 of the terminal. That recording shows a first sequence $S_b$ corresponding to background noise, for example. There then begins a voice sequence $S_v$ uttered by the speaker during dialog with the server 20. In order to inform said server that the uttered sequence $S_v$ is to be processed by the recognition system, the user presses at the time $t_d$ a key of the "push-to-talk" device 12 that either triggers a pulse or opens a window, as shown in FIG. 1(b).

The processing for recognition of the sequence $S_v$ takes effect immediately at the time $t_d$. However, the user's action may be late and the start of the sequence $S_v$ drawn with a dotted line will fail to undergo recognition processing, with all the deleterious consequences that such truncation can have on the final quality of recognition.

To solve this problem, the invention provides for the recognition processing that is to be effected to take account of speech segments contained in the truncated portion of the voice sequence $S_v$ from a time $t_0$ before the time $t_d$ of the user's action.

Figure 1:
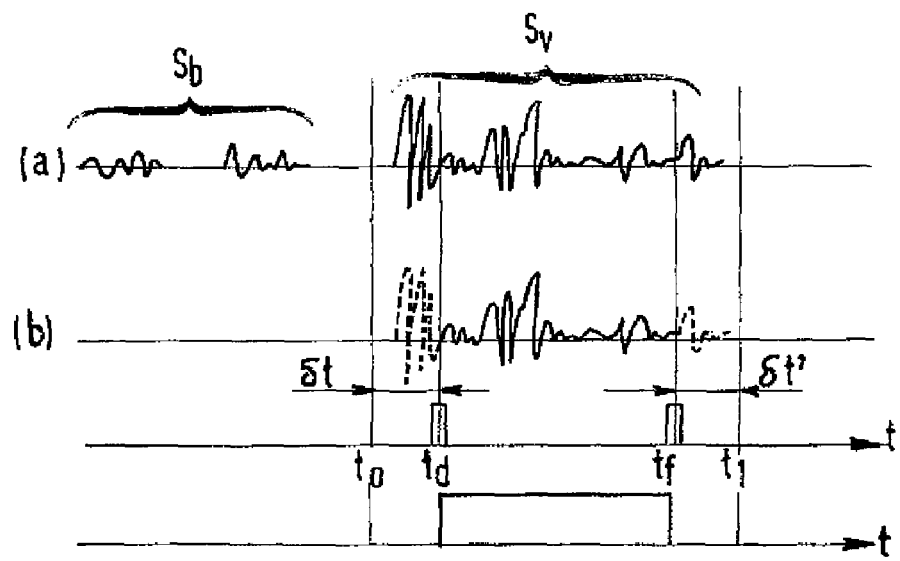
FIG. 1 is a timing diagram representing:
(a) a sound recording effected by means of a microphone of a communications terminal with an automatic speech recognition system; and
(b) the elements of said recording taken into account in the processing effected by the recognition system in a first embodiment of the method of the invention.

In the FIG. 1 example, the time interval $\delta t$ between the times $t_0$ and $t_d$ is sufficiently long to restore the missing part of the sequence $S_v$ in its entirety. The final quality of recognition is then not degraded. In contrast, if the delay is excessive, only part of the truncated portion of the sequence is taken into account, thereby nevertheless improving recognition, but not so much as when reconstitution is total.

Of course, the time interval $\delta t$ must not be too long since that would introduce a recognition offset that would be noticeable to the user. Neither must it be too short, since that could make the synchronization method of the invention ineffective.

Figure 2:
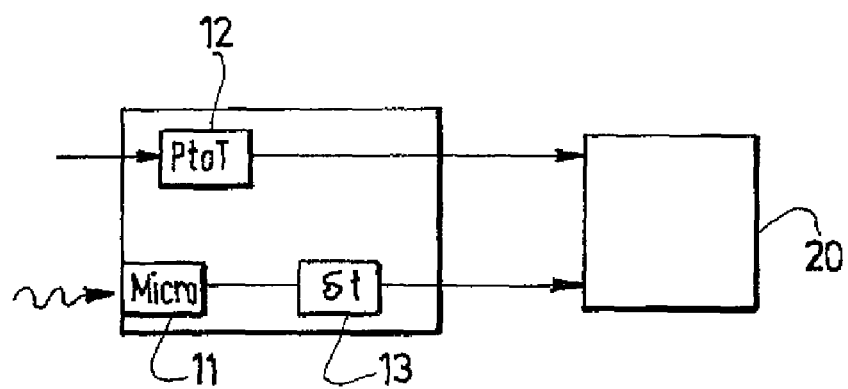
FIG. 2 is a diagram of a terminal for performing said first implementation of the invention.

This synchronization method uses a delay line 13 connected in series with the microphone 11, as shown in FIG. 2.

Figure 3:
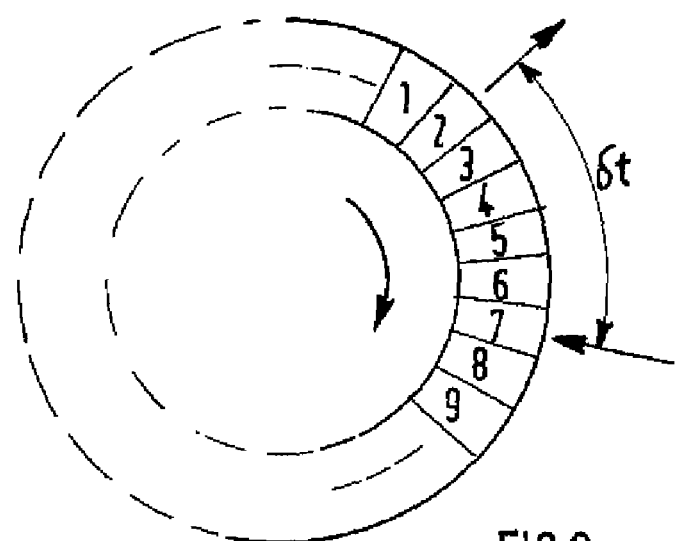
FIG. 3 is a diagram of a circular register for performing the first implementation of the invention.

Said delay line 13 can be produced in the form of a circular register, as indicated in FIG. 3. The samples of the voice sequence numbered 1, 2, 3, etc. are written and then read and transferred to the recognition system, at the same speed, but with a delay expressed as a number of samples corresponding to the fixed time delay $\delta t$. After being read, the samples are destroyed.

It should also be mentioned that the delay line could equally well act on signal analysis frames sent to the recognition system. More generally, the delay line can operate at any point between the signal from the microphone and the input of the recognition system.

As mentioned above, it is possible to transfer the restored portion of the sequence to the recognition system in blocks, which limits any recognition delay, especially since the recognition process is faster than real time.

The advantage of this first implementation, using a delay line, is that it does not increase the computation load on the system.

Figure 4:
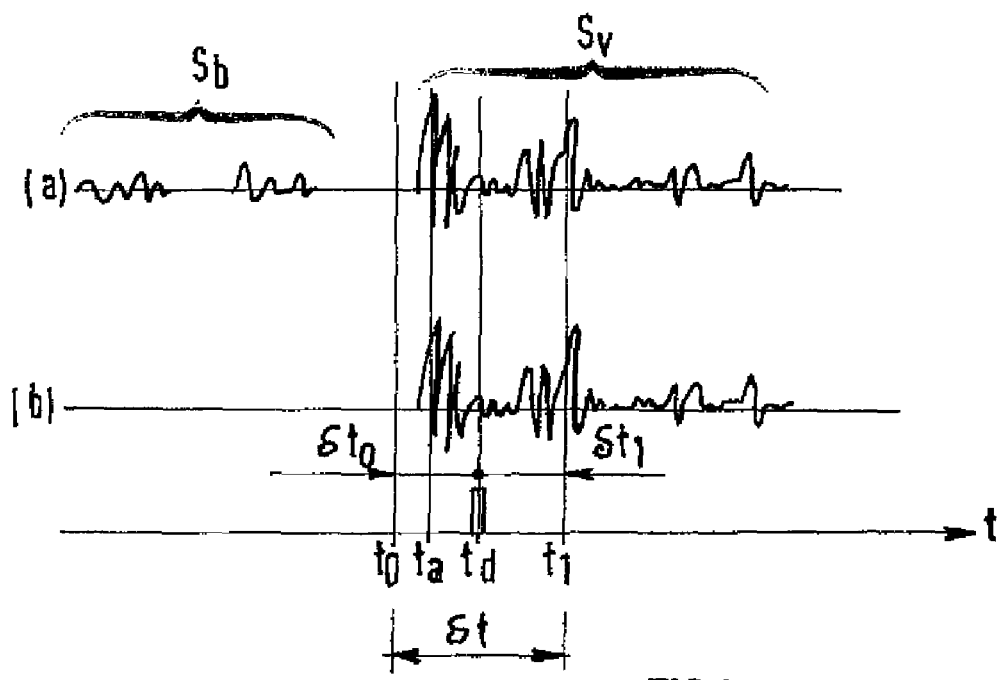
FIG. 4 is a timing diagram representing: (a) a sound recording effected by means of a microphone of a terminal communicating with an automatic speech recognition system, and (b) the elements of said recording that are taken into account in the processing effected by the recognition system in a second implementation of the method of the invention.

FIG. 4 illustrates another implementation of the invention that continuously processes the signal 4(a) from the microphone 11 of the terminal by means of a voice activity detector. The result of this processing is shown in FIG. 4(b) with the sequence $S_v$ being taken into account after it has been detected as a voice sequence at the time $t_a$. Even if the action of the user on the "push-to-talk" device occurs at the time $t_d$ before the time $t_a$ of voice activity detection, the sequence will nevertheless be validated if detection occurred during the time interval $\delta t = \delta t_0 + \delta t_1$ between the times $t_0$ and $t_1$, as seen in FIG. 4. In this figure, $\delta t_0$ is an acceptance time before the action by the user and $\delta t_1$ is an acceptance time after the action by the user.

This embodiment does not introduce any delay because it adds only filtering to the normal recognition processing, but in contrast it does increase the computation load on the system.

As shown in FIG. 1, the user can also indicate the end of a voice sequence by a second action on the "push-to-talk" device at a time $t_f$ that either generates an end of sequence pulse or closes the window that was opened when the sequence started. It can then happen that the user acts too soon, i.e. before the end of the voice sequence $S_v$. Instead of suddenly cutting off acquisition of the speech of the speaker at the time $t_f$, it is proposed to extend the acquisition time and to feed the recognition system during a period $\delta_t'$ corresponding to the tolerance in respect of desynchronization between the action by the user and the end of the sequence $S_v$. It should be noted that this method does not introduce any additional time-delay and provides a simple way to reduce truncation at the end of an utterance.

What is claimed is:

1. A method of synchronizing an operation for processing, by an automatic speech recognition system of a device, a voice sequence ($S_v$) uttered by a speaker and an action of said speaker intended to trigger said processing by the device, wherein said processing operation is effected by the device from a given time ($t_0$) preceding said action of the speaker, and a time interval between said given time ($t_0$) and the action of the speaker corresponds to a given interval.

2. The method according to claim 1, wherein said processing operation comprises transferring speech segments extracted from said voice sequence ($S_v$) to the automatic speech recognition system starting from said given time.

3. The method according to claim 2, wherein said transfer is effected via a delay line.

4. The method according to claim 3, wherein said delay line is provided by a circular register.

5. The method according to claim 1, wherein said processing operation comprises, on detecting the start of voice activity between said given time and a second given time, in validating the automatic recognition of speech that has been effected on said voice sequence.

6. The method according to claim 1, wherein the processing of said voice sequence by automatic speech recognition is extended beyond a second action of the speaker indicating the end of a voice sequence.

7. A communications terminal, including means adapted to implement a method of synchronizing an operation for processing, by automatic speech recognition, a voice sequence ($S_v$) uttered by a speaker and an action of said speaker intended to trigger said processing, wherein said processing operation is effected from a given time ($t_0$) preceding said action of the speaker, and a time interval between said given time ($t_0$) and the action of the speaker corresponds to a given interval, and wherein said processing operation comprises transferring speech segments extracted from said voice sequence ($S_v$) to an automatic speech recognition system starting from said given time ($t_0$).

* * * * *